Aug. 10, 1965  F. MARTI  3,199,324
METHODS OF COLD EXTRUDING METALS
Filed Nov. 2, 1962  6 Sheets-Sheet 1
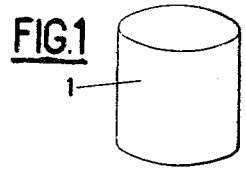
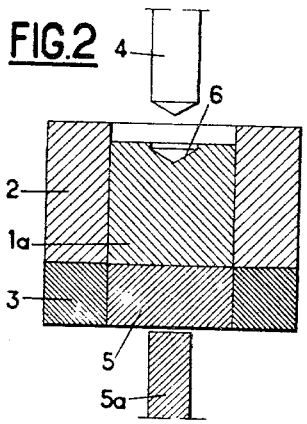
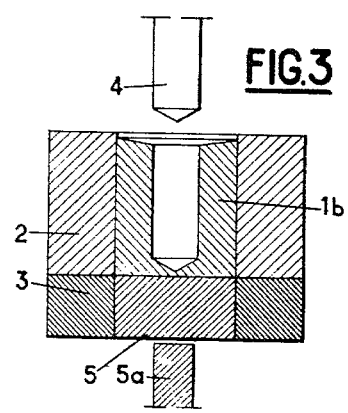
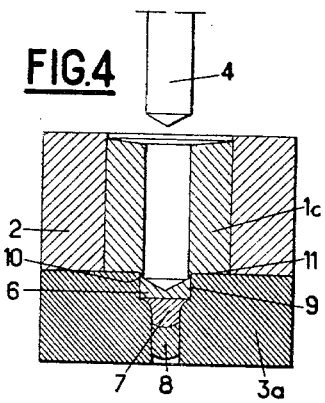
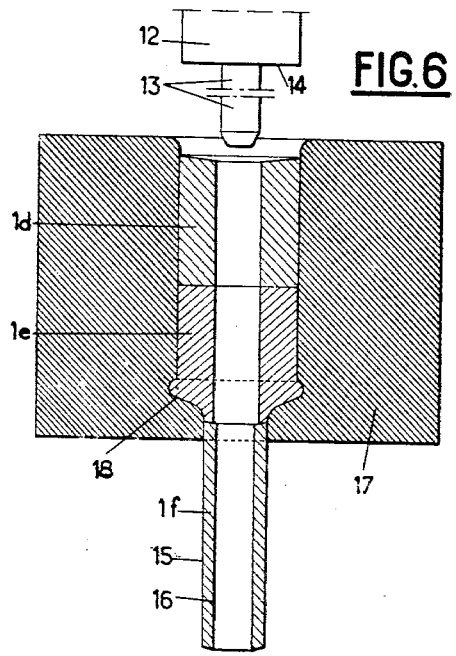
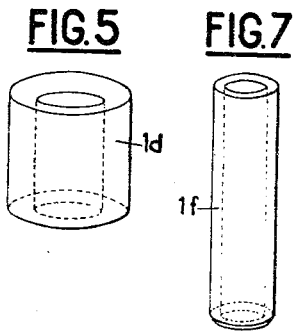
INVENTOR
Frederic Marti
By Holcomb, Wetherill & Brumbaugh
ATTORNEYS Aug. 10, 1965   F. MARTI   3,199,324
METHODS OF COLD EXTRUDING METALS
Filed Nov. 2, 1962   6 Sheets-Sheet 4

INVENTOR
Frederic Marti
By Holcomb, Wetherill & Brisbois
ATTORNEYS

United States Patent Office 3,199,324
Patented Aug. 10, 1965

3,199,324
METHODS OF COLD EXTRUDING METALS
Frederic Marti, Vieux-Charmont, Doubs, France, assignor to S.A. "Industrielle de Precision Marti-I.P.M."
Filed Nov. 2, 1962, Ser. No. 235,603
Claims priority, application France, Dec. 29, 1961, 883,537, Patent 1,322,166
19 Claims. (Cl. 72—42)

This application is a continuation-in-part of my application Serial No. 841,761, filed September 23, 1959, and now abandoned. The file of said application contains an affidavit by Roger Cazaud attesting to certain results secured by the practice of the present invention.

Methods of cold extruding metals have been well developed for several years, but the application of these processes to ferrous metals, and in particular to metals or alloys such as the alloy steels, presents difficult lubricating problems which have not heretofore been solved, except by limiting processesses to the use of a succession of small steps, each of which employs a relatively small deformation ratio so as to permit the metal to be extruded under acceptable conditions.

In order to permit an increase in the deformation ratio it has been necessary to operate at a higher temperature and the finish of the products obtained in this manner has not been perfect.

The various known processes are burdensome to carry out, since they generally require several annealings at temperatures higher than the transformation point of the metal, between successive extruding or drawing passes, and this frequently results in defective products.

It is, moveover, the current practice, in view of the necessity for reducing the deformation ratio, to precede the final extrusion by a preliminary step in which the workpiece is extruded within a die the bottom of which is shaped like the lower face of the workpiece, so that the depth of the extrusion is limited to the depth of penetration of a punch. This punch penetrates to a point a short distance from the die bottom, the bottom web of the workpiece being subsequently cut off.

But this cutting off wastes metal and, since it is usually accomplished by shearing off the metal above its yield point, involves the difficulty that it causes a ragged edge where the bottom web is sheared off and this ragged edge is accentuated during the drawing step which reduces the workpiece to its final dimensions.

In addition to the plurality of annealings already mentioned, this cutting off then requires the workpiece to be ground down after extrusion in order to eliminate the ragged edge resulting from the shearing off of the bottom web.

The advantages of applicant's process are due to perfect lubrication during the extrusion, which is obtained by employing a lubricant such as molybdenum or tungsten bisulfide, the efficacy of which is 100% because it is enclosed under pressure, and which permits the elimination of the ragged edges hereinbefore mentioned and the utilization of the entire length of the workpiece subjected to the extrusion operation, without being required to cut off a defective portion from the workpiece after extrusion.

These results are obtained in part by first providing retaining means which permit the utilization of an efficaceous solid lubricant which is tightly sealed between the workpiece and the machine tools, thereby permitting continuous lubrication during extrusion, and partly by replacing the step of cutting off the bottom web of the workpiece by a step in which the bottom web is extruded with progressive compression and slowing of the flow of the material being extruded, the direction of this flow being opposite to that during the first extrusion passes.

In addition to the adavntages resulting from the elimination of all work beyond the yield point of the metal and of the lubricant, this step of extruding the bottom web is effectuated without any preliminary annealing or restoration of the metal.

The strains caused by the dislocations of the crystalline lattice resulting from the previous operations are in effect partially relieved, and these strains, the orientation of which was unfavorable to the first extruding steps, are, on the contrary, helpful in facilitating the extrusion of the bottom web in a forward direction.

Another advantage of the process according to the inventoin resides in the fact that the final elongation of the workpiece by extrusion may take place after the forward extrusion of the bottom web without requiring a preliminary annealing near the transformation point of the metal, but after carrying out a low temperature annealing in which the workpiece is reheated to a low temperature for several hours (about 300 to 400° C. in the case of the special steels previously mentioned). This low temperature annealing treatment is sufficient to relieve the dislocations of the crystalline network and restore to the material its full capacity for deforamtion, and also has the advantage of not causing any superfical oxidation and not destroying the carbide globules formed on the workpiece before it is extruded. The lubricant, the breakdown temperature of which is higher than that heretofore employed, remains in tact during this restoring treatment.

In order to permit the use of a solid lubricant the extrusion plunger is not at first permitted to penetrate more than a few millimeters into the surface of the workpiece, so as to provide in the upper surface of the workpiece a recess in which this solid lubricant may be deposited. The lubricant may consist of molybdenum or tungsten bisulfide, for example. Such a lubricant, when enclosed, is capable or resisting pressures greater than those developed by the extrusion, while continuing to provide effective lubrication.

It should be noted that by reason of this ability to obtain perfect lubrication during extrusion, it becomes possible to obtain, even with alloy steels which have heretofore been considered impossible to extrude when cold, depths of extrusion for a given outer diameter which have heretofore been considered impossible, thus either permitting the complete elimination of any subsequent extrusion step, as in the case of piston shafts for lightweight motorcycles, for example, or simply making this operation less difficult, while considerably augmenting the life of the dies.

The elimination of the final extrusion step, when possible, permits a considerable supplemental saving, particularly because the heat treating and phosphating steps, which have heretofore normally intervened between the cutting off of the bottom web and the final extrusion of the blank, are then also eliminated.

It is nevertheless possible to improve the method of carrying out those steps which have just been described, even when it is necessary to have a final extrusion step, by also employing for this step a solid lubricant of a type similar to that used for the first extrusion step, without applying it in a suspension in a liquid lubricant.

In this variation of the process, not only may the step of annealing near the transformation point of the metal be eliminated, but it is even possible to avoid subjecting the blank to an annealing step at low temperature after extrusion and cutting off, and consequently, it is possible to also eliminate the phosphating step which ordinarily follows such an annealing at low temperatures.

It then suffices to simply immerse the blank in the solid lubricant before extruding it from the end opposite to the cut off end, for the surface of this blank is, in that case, still sufficiently phosphated to permit the adherence of the solid lubricant.

This simplification may be obtained by providing at the beginning of the final extrusion, a preliminary step in which the blanks are compressed by means of a mandrel carrier provided at its lower end with a circular peripheral rim which produces at the upper end of each blank, a retaining groove for the solid lubricant so as to insure the lubrication of the next blank.

The final extrusion process is then modified as follows: After immersing the workpiece from which the bottom has been removed in the solid lubricant, it is subjected to a compression step carried out by means of a mandrel carrier provided with the rim hereinbefore described, which is pressed against the end from which the bottom has just been removed. The mandrel carrier is then withdrawn and a solid lubricant of the type hereinbefore described is introduced into the upper part of the workpiece which is already partially extruded, filling the retaining groove created during the preceding compression step. A new workpiece which has been given a preliminary coating of solid lubricant as hereinbefore described, is then introduced above the partially extruded workpiece, with the end from which the bottom was removed upward, so that it may first be used as a pressure block during the last part of the final extrusion of the preceding workpiece. The workpiece which serves as a pressure block is then subjected to the pressure of the mandrel carrier with its circular peripheral rim, while its lower end begins to contract. The mandrel carrier is again withdrawn to permit introduction of the solid lubricant and a new workpiece which has been given a preliminary lubrication, and so on.

Other advantages of the present invention will be better understood from reading the following description of the manufacture of cylindrical piston shafts by extruding them according to the process constituting the invention. This description is given purely by way of example, and with reference to the attached drawings on which:

FIG. 1 is a perspective view of a cylindrical workpiece which is to be subjected to extrusion;

FIG. 2 is an axial cross-section through the extrusion plunger, the die and the ejector taken after the first superficial extrusion or stamping step which permits the use of a solid lubricant;

FIG. 3 is an axial cross-section taken through the same elements after the second extrusion step;

FIG. 4 is an axial section taken through a die and an extrusion plunger after the third step in which the bottom web is forwardly extruded with retardation of the flow of the material and compression of the bottom webs of those workpieces just previously extruded.

FIG. 5 is a perspective view of the extruded workpiece after the bottom web has been cut off;

FIG. 6 is an axial cross-section of a die, of a mandrel carrier and of an extrusion mandrel showing the positions of the three members superposed during the elongation of the intermediate workpiece, and the progressive reduction in diameter of the workpieces;

FIG. 7 is a perspective view of the workpiece as it appears after its elongation;

It is clear that the cylindrical workpieces shown on the attached drawings could be replaced by blanks having oval or polygonal cross-sections, or cross-sections having other appropriate shapes, the sections of the dies, plungers and mandrels being correspondingly modified.

Figure 10:
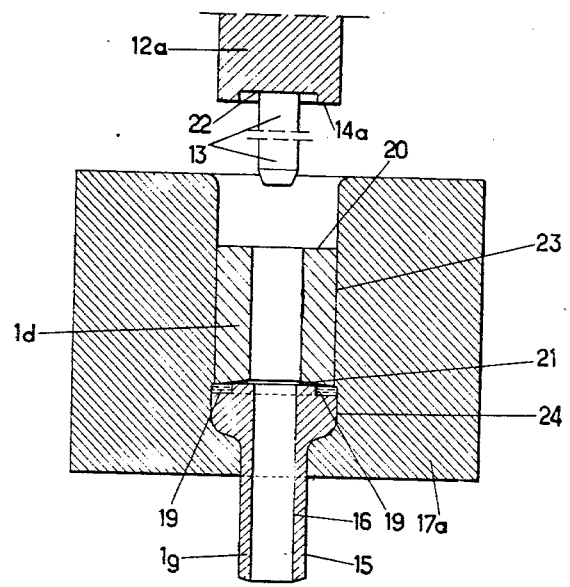
FIG. 10 is an axial cross-section through an extrusion die with its rim-bearing mandrel carrier, and its extrusion mandrel, showing a lower blank being extruded and an upper blank serving as a pressure block during the end of the extrusion of the lower blank, after which it is acted upon by the rim-bearing mandrel carrier.

The workpieces being manufactured and subjected to the extruding steps illustrated in the first ten figures are designated respectively according to deformation stages by reference character 1 in FIG. 1, 1a, in FIG. 2, 1b in FIG. 3, 1c in FIG. 4, 1d in FIGS. 5, 6 and 10, 1e in FIG. 6, 1f in FIGS. 6 and 7 and 1g in FIG. 10. The workpieces in the process illustrated in FIGS. 11–14 are designated respectively by reference character 24 before pressure is applied, 24a after having been subjected to the first step of this process, and 24b after having been subjected to the second step. The workpiece which is wasted at the start of this process is designated by reference character 27.

The extrusion die used for the three first steps corresponding to FIGS. 2, 3 and 4 comprises two sections. The first section is designated by reference numeral 2, the lower parts of the dies by 3 and 3a, the extrusion plunger by 4, the ejector by 5, and its actuator by 5a. This ejector is shown only on FIGS. 2 and 3. On FIG. 4, which illustrates the step of forward extrusion, the bottom web of the workpiece 1c, which has just been separated from the extruded workpiece, is designated by reference numeral 6.

As they slow the flow of the material through the opening left in the lower part 3a of the die used for the third step, the bottom webs are hammered into taking successively the forms 7 and 8 of decreasing diameters with respect to the bore of the workpiece 1c. The result is to axially compress each bottom web as it is being extruded out of the workpiece, thus radially extruding some of the material therein into the annular space between the area below the punch and the wall of the die. This radial extrusion takes place beyond the elastic limit of the workpiece metal, so that the fibers therein are permanently realigned.

The lower part 3a of the die comprises a bore 9 having a diameter slightly larger than that of the plunger 4, the difference in diameter being very small. Under these connditions, the bottom web 6 separates from the workpiece 1c along a substantially circular cleavage line 10, slightly below the bottom 11 of the workpiece 1c.

The workpiece may then be transformed from the form 1c to the form 1d by removing the small burr between 10 and 11, in any suitable manner.

Figure 8:
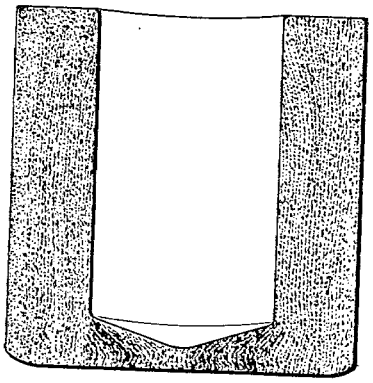
FIG. 8 is a macrograph taken along an axial section of the workpiece after the second extrusion step shown in FIG. 3 and showing the disposition of the fibers of the metal.
Figure 9:
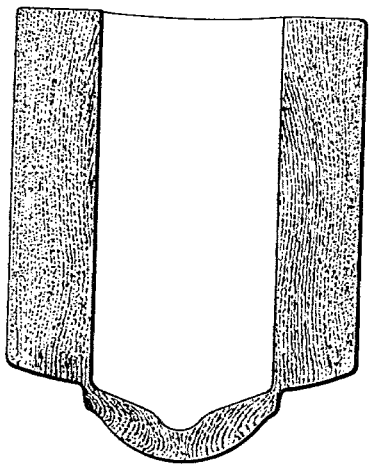
FIG. 9 is a macrograph taken along an axial section of the blank after the third step of forwardly extruding the bottom web represented on FIG. 4, showing the disposition of the fibers of the metal.

On comparing the two macrographs of FIGS. 8 and 9, it will be easy to understand the reason why no heat treatment is necessary between the second extrusion step and the step of opening up the workpiece by cutting off the bottom web.

In fact, the fibers of the lower part of the blank which are directed toward its center are straightened out into the direction of the lower part of the die in the course of the web removing step of FIG. 4. This straightening out of fibers of the central part of the blank is brought about by the effect of compressing the material near the plunger, in a direction perpendicular to that of the fibers, so that this material has no tendency to tear while the bottom web is being removed, as in a shearing step, but tends on the contrary to fill up perfectly even the space surrounding the bottom of the plunger. It is easy to understand, moreover, that the action of the plunger would be more likely to result in the formation of tears by shearing the material if the metallic fibers were oriented at the bottom in the direction of the periphery of the die.

The process according to the invention thus results in a workpiece which is absolutely sound throughout the length of its bore, and which is subsequently used in the extrusion operation illustrated on FIGS. 6 and 10.

It is clear that the workpiece may be extruded to an increased diameter instead of a reduced diameter, and that finished workpieces having several different inner and outer diameters may be produced.

The examples of FIGS. 6 and 10 relate to tubes destined to be made into piston shafts. The outer diameter of the workpiece 1e is progressively reduced from 30 mm. to 22 mm., and the interior bore from 16 to 15 mm.

The length of the workpiece 1d is, on the other hand, increased from 29 mm. to 75 mm.

On FIG. 6 is shown the mandrel carrier 12 used in the final extrusion which bears with its lower part 14 on the upper part of the workpiece 1d which is utilized as a distance piece to permit the extrusion of a workpiece such as 1e, shown in the figure as in the course of manufacture, a workpiece which itself bears on a workpiece 1f, also shown in FIG. 7.

The mandrel carrier 12 is equipped with a mandrel 13, the diameter of which is less than that of the bore of the workpieces 1d and 1e.

During the final extrusion, the exterior diameter of the extruded workpieces is reduced to that indicated at 15 at the bottom of FIG. 6.

In the same manner, the inner diameter of the extruded workpiece 1f is reduced to the diameter indicated at 16, that is to say the diameter of the mandrel 13 of the mandrel carrier 12.

In order to prevent the workpieces 1d, 1e and 1f from rising with the spindle carrier when it is withdrawn, a retaining groove 18 is provided in the die 17 as shown on FIG. 6. The material on the outside of the workpiece 1e enters into this groove as it is extruded so as to create a stop of sorts when the mandrel is raised.

The solid lubricant, which is enclosed at the end of the extrusion plunger after the step of forming the retaining hole 6a shown on FIG. 2, is drawn down to the bottom by this plunger, thereby providing efficaceous lubrication of the entire surface acted upon by the plunger to the full extent of its descent.

The conventional phosphating steps which permit the adherence of suitable lubricants are applied to the workpiece 1 shown on FIG. 1, but if the phosphated coating is broken in the course of the extrusion, the solid lubricant continues to insure efficaceous lubrication. Experience has proven that there is absolutely no leakage, for the surface which was in contact with the plunger, even that of the bottom web, shows no tears. Suitable coatings for this purpose include zinc phosphate, sodium soap, sodium silicate, and "Bonderlube" which is a mixture of mineral oil, tall oil, fatty acids, stearic acids, and the hydroxide of an alkali metal such as potassium, fully described in French Patent No. 1,155,105 of 1954.

The use of such a solid lubricant by simply depositing it on the upper surface of the workpiece would not be possible without resort to the step shown, in FIG. 2, for the solid lubricant would otherwise be forced out, either by the plunger or by the air current caused by its descent.

It should be noted, however, that the solid lubricant may also be introduced by adding it to the bath in which the lubricating soap is deposited on the workpiece after phosphating.

In the extrusion process illustrated as an alternative on FIG. 10, the mandrel carrier is indicated by reference character 12a, and the mandrel by the numeral 13, the lower part of the mandrel carrier 12a comprising a peripheral rim designated by 14a.

The blank being extruded in the die 17a is indicated by reference character 1g and the circular groove receiving the solid lubricant by 19. The upper blank 1d which will serve as a driving block to permit the completion of the extrusion of the blank 1g has been shown on FIG. 10 in the position corresponding to the moment at which it has just been introduced into the die, that is to say, before it has been acted upon by the mandrel carrier. When the rim 14a is brought to bear on the upper part 20 of the blank 1d, the material forming the blank is not only pressed into the groove 19 so as to cause lubrication of the following blank, but also contracts to the diameter 16 corresponding to that of the mandrel 13.

The lubrication process carried out during the descent of the blank 1d is as follows.

The lubricant introduced into the groove 19 is also projected over the upper part 21 of the blank 1g, this part 21 corresponding to the groove 22 in the mandrel carrier 12a. By reason of the slight clearance corresponding to the difference between the inner diameter of the die, at its upper end, where the diameter is that of the bore 23, and that at its middle part, where the diameter is that of the bore 24, the lubricant contained in the groove 19 rises progressively upward about the periphery of the blank 1d as this blank is forced down.

In like manner the pressure exerted on the upper part 20 of the blank 1d tends to drive the lubricant up between the inner bore of the blank 1d and the mandrel 13 at the same time that the diameter of the blank itself tends to decrease toward the exterior diameter of the mandrel 13.

In this manner, the blank 1d, which has already been given a preliminary coating of solid lubricant, finds itself again lubricated inside and out before reaching the point at which it begins to be reduced in diameter. The heating due to the extrusion is moreover insufficient to destroy the solid lubricant used, which as has already been indicated, is preferably molybdenum or tungsten bisulfide.

At the moment at which the mandrel carrier 12a and the mandrel 13 rise upward again to permit the introduction of the blank 1d, the blank 1g is prevented from travelling upward with the mandrel by the peripheral enlargement of the blank 1g resulting from the difference between the diameter of the bores 23 and 24.

This insures lubrication of the inside of the blank 1g, since the mandrel 13 in its upward movement obviously rubs against the inner surface of the bore 16 and thereby draws the solid lubricant progressively upward.

So far as the final extrusion proper is concerned, the heating which it causes is limited by the fact that the solid lubricant tends to rise progressively along the exterior diameter 15 of the workpiece being extruded, thereby assuring the external lubrication of the workpiece all the way up to its upper end, that is to say, up to the level of the bore 24.

To sum up, by providing a groove for holding a solid lubricant at the upper end of the blank, before it is subjected to the final extrusion step, applicant obtains by means of the pressure of the two blanks against each other, a progressive rising of the lubricant along the walls of the upper blank, thus producing a lubrication which is effective not only during the actual extrusion, but also during the upward withdrawal of the mandrel.

It will thus be seen that the utilization of a lubricating solid suspended in a lubricating soap such as that commercially known as "Bonderlube," which constitutes a new step applicable before the first extrusion step, and in the case of FIG. 6, before the final extrusion, is no longer necessary in the case illustrated in FIG. 10 in which the solid lubricant may be utilized in its natural form since it may then adhere to the surface of the extruded and open blank.

It is easy to understand that soaking the workpiece in such a saponaceous suspension, before extrusion, permits the solid lubricant to be spread over all the surfaces thereof so that it adheres well and uniformly.

Another characteristic of the process illustrated by FIG. 10 resides in the fact that the final extrusion of the workpiece is carried out after it has been turned upside down, so that the material thereof flows during final extrusion in a direction opposite with respect to the body of the workpiece, from the one in which the bottom web was extruded. Under these conditions, the successive dislocations resulting from the extrusion of the bottom web, are, after the workpiece is turned end for end, oriented in a direction favorable to the flow of the material, or at least providing no great resistance thereto, which facilitate the work of extrusion as compared to conventional previously known processes, thus reducing the temperature of the dies, of the mandrel carriers, and the extrusion mandrels.

Thus, thanks to the rim 14a on the mandrel carrier which defines a groove for receiving the solid lubricant, and to the preliminary reversal of the extruded and bored workpiece, before it is finally extruded, this final extrusion may be carried out by the method illustrated by FIG. 10 without any preliminary reheating, by simply immersing the phosphated blank in the suspension of solid lubricant.

It should be noted that the extrusion mandrels and the dies heat up progressively, and that the first workpiece which is drawn at a relatively low temperature is only imperfectly lubricated by the solid lubricant since a substantial quantity of solid lubricant is not introduced into a retaining groove until the moment when the first blank is partially extruded and occupies the position illustrated at 1g on FIG. 10.

As the temperature of the die and extrusion mandrel increase, the need for the lubricant retaining groove becomes more and more imperative but, in practice, from the introduction of the second workpiece into the extrusion die to serve as a pressure block during the completion of the extrusion of the blank 1g first introduced, adequate lubrication of all the succeeding blanks is assured.

In the preamble to the present specification I have indicated the advantages obtained by utilizing the method illustrated on FIG. 4, in comparison with conventional processes according to which the bottom web is cut off by shearing the metal, which processes result in ragged edges due to tearing at the lower part of the blank being worked. These tears do not exist on the workpiece 1c because of the possibility of working below the yield point of the metal by flowing the material toward the bottom, that is to say, forward, a flow which is nevertheless slowed and directed radially outward by the presence of the bottom webs 7, 8, which are being progressively reduced in diameter in the bore of the die 3a.

It has previously been mentioned that the three steps of extrusion and opening up represented respectively on FIGS. 2, 3 and 4 may be taken one after the other, without any intervening thermal treatment. This permits the three steps to be grouped in a single pressing operation by using a revolving table or any other suitable feeding means, and multiple plungers, and by simply substituting between the second and third steps, the lower part 3a of the die of FIG. 4 for the part 3 of FIGS. 2 and 3, with the ejector 5 and ejector actuator 5a. The three operations may now be carried out during a single descent of the press and the working time is reduced to that of a single step.

However, the output of an installation of this type leaves much to be desired because of the necessity of effecting a seal between the die bodies mounted on the turret plate and the die bottoms mounted on the fixed part of the frame in alignment with the three aforesaid plungers.

I have accordingly developed another process which makes it possible with a single punch and a single die bottom to effect simultaneously the first two operations of forming a recess for lubricant and the extrusion, and in particular to reduce considerably, particularly at its peripheral portion, the thickness of the bottom web which is to be removed, by bringing the connection existing at the end of the extrusion operation between the bottom web and the extruded blank to a lower level than the remainder of the base of the said blank, that is to say by effecting directly, at the end of the operation of backward extrusion, a slight forward extrusion of the said bottom web.

This feature makes it possible to eliminate the separate operation of opening up the blank by forward extrusion of the metal of the bottom web, and as this sheet is of very slight thickness it becomes possible to remove it by simply cutting through, the portion torn in the course of this cutting being then easily eliminated by a cropping operation as in the case of the tear which is produced during the removal of the bottom web from the blank in the process which has been hereinbefore described.

In the process illustrated in FIGS. 11–14, it is possible to achieve this result by providing a die adapted to receive two superposed billets and having in addition at its base an ejector forming the die bottom and having a conical central portion, the bottom blank acting towards the top blank as a die bottom adapted to be slightly dished at its top portion in the vicinity of the base of the top blank and being dished at its bottom portion from the commencement of the descent of the punch to the level of the said conical central portion of the ejector.

This bottom blank is then used, after being inverted and after solid lubricant has been introduced into the cavity created by the action of the aforesaid conical central portion of the ejector, as an upper blank intended to be subjected to the direct action of the punch, and as the angle of opening of the said conical portion is slightly smaller than that of the conical portion of the extrusion punch there remains between the bottom of the cavity and the base of the punch a space in which the said suitable lubricant is enclosed and from which it can escape only by rising along the periphery of the punch under the action of the rising of the metal of the blank during the extrusion.

The first top blank being badly lubricated during the extrusion, since it has no cavity to receive solid lubricant, has considerable surface defects along its bore, and for this reason this defective blank is discarded.

On each consecutive operation, a billet is introduced into the die in the lower position at the same time that the bottom blank obtained from the previous operation of the press is placed thereabove, so that the work of extruding the upper blank is always effected with suitable lubrication at the same time that the bottom blank under the action of the work of extrusion of the top blank receives a depression at its top, thus enabling the punch to drop below the bottom level of the peripheral portion of the upper blank, while the said lower blank is dished at its bottom so as to form a cavity to receive solid lubricant permitting during the next operation correct lubrication of the periphery of the punch.

It is obvious that it is possible to prepare in advance a small quantity of blanks having a cavity to receive solid lubricant, so as to facilitate on each upward stroke of the punch the simultaneous placing in position of the two blanks in the die without having to use for each operation the bottom blank from the preceding operation.

Referring now to FIGURES 11–14, it will be seen that the die 21 has at its lower end an ejector 22 forming the die bottom and having a conical central portion 23.

Figure 11:
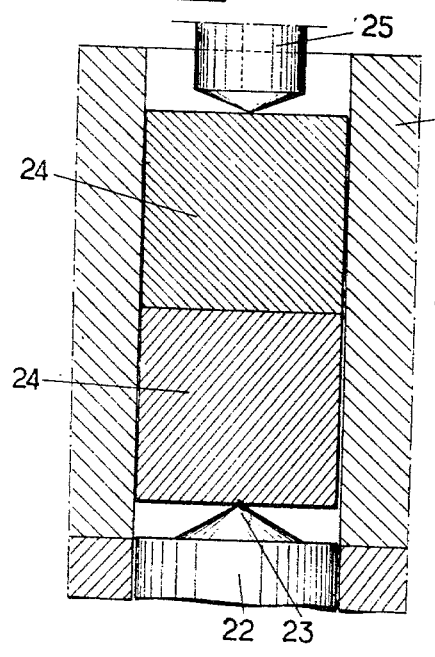
FIG. 11 shows two superimposed billets in an extrusion die designed for carrying out an alternative step serving a purpose similar to that of the process illustrated in FIGS. 2 and 3.

The two billets 24 in FIGURE 11 are billets which have undergone no extrusion or dishing operation and are simply covered with a suitable phosphating coating, to which there adheres a liquid lubricant rendering the surface slightly greasy and adapted to retain superficially a little powder of the same solid lubricant which is used subsequently for filling the above-mentioned cavity.

Figure 12:
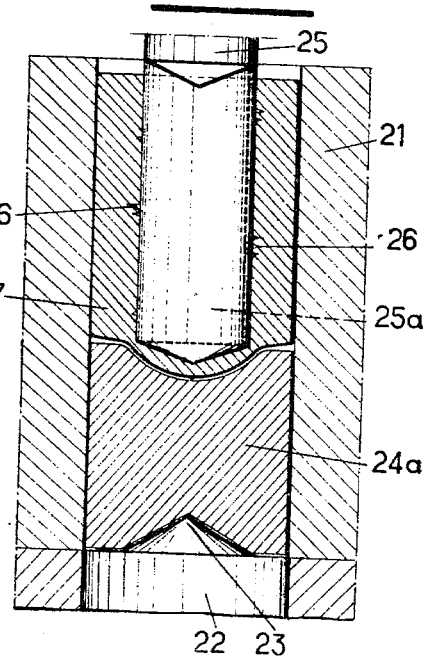
FIG. 12 shows the blanks of FIG. 11 after the ram has completed its downward stroke.

After its upward stroke, the punch 25, which is visible in the different figures and is shown in its upper position in FIG. 12, acts on the top billet 24 with insufficient lubrication, so that the descent of the punch 25 to its bottom position 25a, shown in broken lines in FIGURE 12, and then its upward stroke produces on the bore created during its downward stroke tears which are diagrammatically represented at 16 in the said FIG. 12.

In the same FIG. 12 it is seen that the bottom billet 24 of FIG. 11 has been subjected during the extrusion of the top blank 27 to compressive forces which have given it the new shape indicated by reference numeral 24a.

On the one hand, in descending to the position 25a the punch 25 has dished the upper surface of the bottom billet and on the other hand, the conical portion 23 of the ejector 22 has formed a conical cavity in the bottom of the blank 24a.

When this blank 24a is inverted and placed in the position shown in FIG. 13, it is seen that a cavity 29 exists below the punch 25, in which a supply of solid lubricant can be enclosed.

The concave portion 30 formed during the previous operation of the punch will progressively decrease in volume under the pressure of the punch 25 and the bottom surface of the blank 24a and the upper surface of the bottom billet 24 will both become curved in the opposite direction, so that such extrusion yields a blank 24b having a very thin bottom web 32 which can be removed without special precautions. The fibers in the lower part of the blank will be positioned as shown in FIG. 15, and the surface defects due to subsequent removal of its bottom web are limited to a small burr 33 indicated diagrammatically in black in FIG. 14, which burr may be removed by cropping or grinding down, as has been indicated above. This operation can be effected by transfer to a last working station in the same press, that is to say without any additional operation. It will be appreciated that the depression formed in the top of billet 24a has a diameter slightly greater than that of the punch 25, so that as the bottom web is extruded into the depression it is axially compressed and radially extruded beyond its elastic limit, thus straightening the fibers at the inner edge of the bottom of the resulting tube, such as described in connection with FIGS. 4, 8 and 9.

Figure 13:
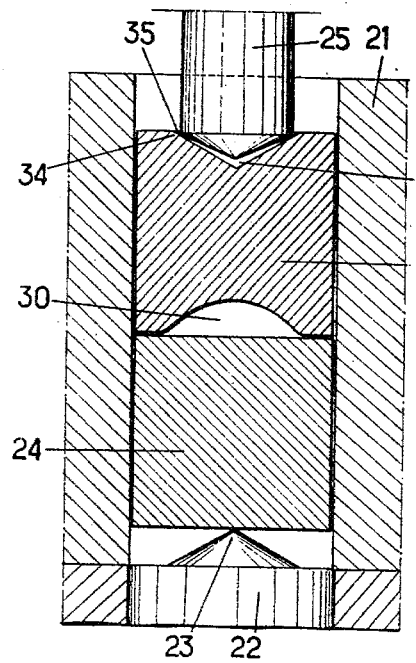
FIG. 13 shows the lower billet of FIG. 12, repositioned in the die above a new billet which has been substituted for the upper billet of FIG. 12.
Figure 14:
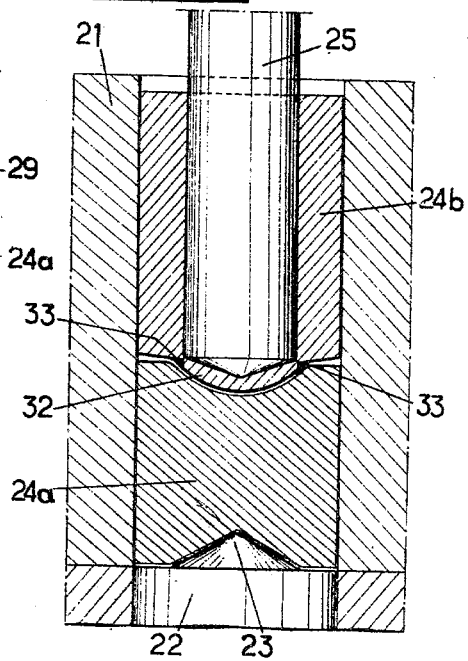
FIG. 14 shows the arrangement of FIG. 13, after the ram has completed its stroke.
Figure 15:
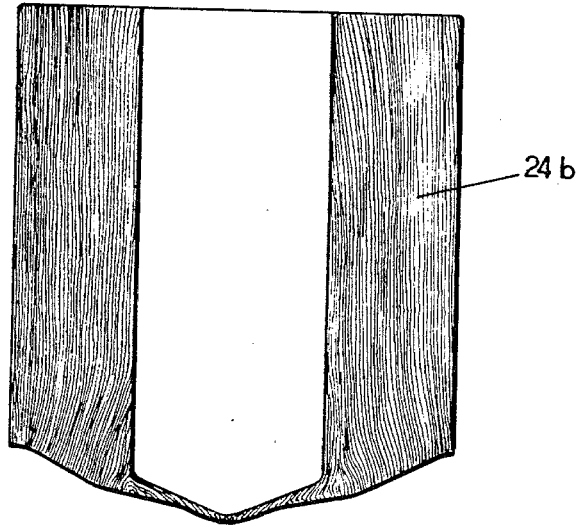
FIG. 15 is a view similar to FIG. 9, showing the disposition of the fibers in the upper billet after completion of the step shown in FIG. 14.

With regard to the bottom billet 24b in FIG. 14, once the operation of extrusion of the top blank has been completed, the billet 24b leaves the die provided with a cavity 29 similar to that shown in FIG. 13 and in which the solid lubricant can remain enclosed beneath the punch 25 when the latter has closed this cavity hermetically, from the commencement of the following extrusion operation.

The metal situated in the top part 34 of the blank 24b, visible in FIG. 13, is extruded in the upward direction by application against the wall of the punch 25, which enables the lubricant to escape from its cavity only along that wall.

It is seen in fact that before the commencement of the extrusion there exists at the top part of the lubricant cavity a small annular space 35, outside the punch and resulting from the fact that the diameter of the conical portion 23 of the ejector is slightly greater than that of the punch.

This annular space 35 is not illustrated in FIG. 14, because when extruded in the upward direction the metal is applied against the periphery of the punch 25 from the commencement of the penetration of the latter into the metal of the blank 24b.

By avoiding all thermal treatment near the transformation point of the metal, my process avoids the destruction of the carbide globules between the initial and final extrusions. The latter operation may then, like the initial extrusion, be carried out at a lower pressure.

It should be noted that by assuring an efficacious lubrication, and by eliminating the tears resulting from shearing of the metal, the process according to the invention also avoids the formation of micro-welds and the abnormal elevation of the temperature of the lubricant and the machine tools which results from the pulling away of such micro-welds. Such an increase in temperature would lead inevitably to the destruction of the lubricant adhering to the phosphate layer, and consequently to abnormal wear on the machine tool.

Any damage to the sides of the plunger and the dies due to premature wear is thus avoided, and the working tolerances may be respected.

Moreover, the elimination of the heat treatments at high temperatures, and the possibility of simply eliminating all heat treatments between the different extrusion steps, permits the avoidance of the formation of scale.

The process according to the invention makes it possible to manufacture extruded shapes which are perfectly sound throughout their length, and have no tears at their lower end. This process may therefore be utilized for the manufacture of tubular shapes with a substantial economy in both labor and material.

Moreover, the working of alloy steels, heretofore considered impossible by cold extrusion, may be carried out without difficulty and without requiring the use of pressures greater than the resistance of the machine tools.

As used herein, the term "cold" describes a process which is carried out without adding to the workpiece heat other than that resulting from applied pressure in a quantity sufficient to materially affect its plasticity.

It will of course be appreciated that the embodiments described herein may be changed, improved or added to, and that certain mechanical details may be replaced by equivalent devices without thereby departing from the spirit of the invention as defined by the following claims.

What is claimed is:

1. The process of cold extruding a hollow cylinder from a steel workpiece which has been conventionally lubricated for cold extrusion, said process comprising the steps of confining the sides of said workpiece to prevent radial expansion thereof, fixedly supporting one end of said workpiece to prevent longitudinal movement thereof, creating in the unsupported end of said workpiece a central cavity having sides adjacent its mouth which are parallel to the direction of extrusion, depositing in said cavity a supply of a solid lubricant having the lubricating qualities common to tungsten bisulfide and molybdenum bisulfide, inserting in said cavity the working end of a punch having a cross-section mating exactly with that of the mouth of said cavity so as to tightly seal said solid lubricant between said punch and workpiece, forcing said punch into said workpiece to form it by backward extrusion into a cup having sides and a bottom, ceasing to fixedly support the entire workpiece end, and driving a central portion from said bottom by exerting sufficient pressure against the inner surface of said central portion to drive it out of said workpiece while firmly supporting a peripheral area of the outer surface of said bottom radially spaced from said central portion against movement in response to said pressure and yieldingly supporting the area of said outer bottom surface within said peripheral area with a resistance to said pressure sufficient to cause compression of said central bottom portion as it is driven out, the temperature of said workpiece being kept below its annealing range throughout the process.

2. The process claimed in claim 1 which comprises the step of subsequently forwardly extruding said workpiece through a reducing die with the end of the workpiece from which said bottom was punched out passing through said reducing die last, said workpiece being kept below its transformation temperature throughout the process.

3. The process claimed in claim 2 according to which after said central bottom portion has been punched out a peripheral depression is formed in the end of said workpiece opposite from that which originally contained the central depression, an additional supply of said solid lubricant is inserted in said depression, an additional workpiece is placed on said first mentioned workpiece within said die and adjacent said peripheral depression, the peripheral edge of said additional workpiece adjacent the first mentioned workpiece being spaced from the bottom of said peripheral depression, and pressure is applied to said additional workpiece to advance both workpieces in said die, so that the solid lubricant in said depression serves as a lubricant for the sides of said second workpiece as it is advanced through said die.

4. The process claimed in Claim 1 in which said steel is an alloy steel.

5. The process as claimed in Claim 1 in which only a single punch is used to form the cup.

6. The process of forming a cylinder from a cup-shaped workpiece having sides and a bottom, said process comprising the steps of exerting sufficient pressure against the inner surface of said central portion to drive it out of said workpiece while firmly supporting a peripheral area of the outer surface of said bottom radially spaced from said central portion against movement in response to said pressure and yieldingly supporting the area of said outer bottom surface within said peripheral area with a resistance to said pressure sufficient to cause compression of said central bottom portion as it is driven out, and then forwardly extruding said workpiece through a reducing die with the end of the workpiece from which said bottom was punched out passing through said die last, said workpiece being kept below its transformation temperature throughout the process.

7. The process claimed in claim 6 according to which said workpiece is externally lubricated in a manner conventional in cold extrusion processes before said forward extrusion takes place.

8. The process of cold punching the bottom from a cup-shaped steel workpiece having sides and a bottom surrounded by said sides, said workpiece comprising fibers in adjoining portions of said sides and bottom which are inclined downwardly and radially inward at an angle to the direction in which said bottom is to be punched out, said process comprising the step of exerting sufficient pressure against the inner surface of said bottom to drive it out of said workpiece, while firmly supporting against movement in response to said pressure a peripheral area of the outer surface of said workpiece beneath said sides and radially spaced from the area against which said pressure is exerted, and while causing those of said angularly positioned fibers which are to remain in the workpiece after said bottom has been punched out to become permanently realigned so that they are parallel to the direction in which said pressure is exerted by yieldingly supporting an area of said outer workpiece surface within said peripheral area with a resistance to said pressure sufficient to extrude material from that portion of said bottom wihch adjoins said sides radially into the space between the area against which pressure is exerted and said firmly supported peripheral area.

9. The method of providing lubrication between the surfaces of a punch having an end portion which decreases in diameter toward its tip and the inner surfaces of a hole to be formed by said punch in a steel workpiece, said method comprising the steps of forming in said workpiece a depression which decreases in diameter toward its bottom less rapidly than the end of said punch, the transverse cross-section of said depression being geometrically similar to that of said punch end, inserting a solid lubricant in said depression and trapping said lubricant between said punch end and said depression bottom by inserting said punch end into said depression with its periphery in sealing contact with the wall of said depression.

10. The method of removing the bottom from a steel cup which has been formed by a process of cold backward extrusion which left fibers in the area connecting the bottom and sides of said cup aligned at an angle to the direction of extrusion, which method comprises the step of cold extruding said bottom forwardly from said cup against a resistance sufficient to create radial pressure against said fibers bringing them back into alignment with the direction of extrusion.

11. The method of forming a steel tube which comprises the steps of stamping a depression into at least one end of a steel workpiece, depositing a supply of lubricant in said depression, inserting into said depression the working end of a punch shaped and dimensioned to form with said depression an enclosure in which said lubricant is trapped, cold extruding said workpiece backwardly into the shape of a cup by driving said punch thereinto while said workpiece is laterally confined and externally lubricated, and cold extruding the bottom forwardly out of said cup against a yielding resistance which causes radial extrusion of the material of said bottom beyond its elastic limit in addition to said forward extrusion.

12. The method claimed in claim 11 according to which the yielding resistance to forward extrusion of said workpiece is provided by a second workpiece of like material in axial alignment with the first and which rests on a projection which is stationary during said extrusion step, and said pressure drives said bottom into one end of said second workpiece and said projection into its other end, thus forming two axially opposed depressions in said second workpiece.

13. The method claimed in claim 12 according to which a lubricant is then deposited in the depression formed by said projection and said second workpiece is used as the first workpiece in a subsequent tube forming operation, said lubricant being trapped between said punch and the workpiece containing said depressions.

14. The method of removing the bottom from a cup-shaped steel workpiece having sides and a bottom, which method comprises the steps of cold pressing a punch having a working end which gradually decreases in diameter toward its tip against the inner surface of said bottom while yieldingly supporting the outer surface thereof with a deformable material having a ductility and tensile strength approximating that of said workpiece, the pressure exerted being sufficient to cold extrude said bottom beyond the sides of said workpiece into said yielding supporting means, while simultaneously compressing said bottom and extruding material therefrom radially toward the sides of said workpiece.

15. The method of removing the bottom from a cup-shaped cold steel workpiece having sides and a bottom which comprises the step of exerting sufficient pressure on the inner surface of said bottom to cold extrude it longitudinally beyond said sides while simultaneously bringing to bear against the outer surface of said bottom a resistance to said pressure which causes the material of said bottom to be extruded beyond its elastic limit radially as well as longitudinally with respect to the direction in which said pressure is exerted.

16. The method claimed in claim 15 according to which said workpiece comprises fibers in adjoining portions of its sides and bottom which are inclined downwardly and radially inward at an angle to the direction in which said pressure is exerted, and the extrusion of said bottom serves to realign those of said fibers which are to remain in said workpiece after removal of said bottom so that they are parallel to the direction in which said pressure is exerted.

17. The method of removing a bottom piece from a cold cup-shaped steel workpiece which comprises the step of exerting pressure on the inner surface of said bottom piece, thereby forcing it into a shallow recess having outwardly sloping sides, a diameter slightly greater than that of the bottom piece to be removed and an average depth less than the thickness thereof, so that said pressure causes the material in said bottom piece to be extruded radially beyond its elastic limit as well as forwardly in the direction of said pressure.

18. The method claimed in claim 17 according to which said workpiece is first formed into a cup by driving a punch thereinto while the side of said workpiece opposite said punch is supported against the pressure thereof by a second workpiece, the pressure of said punch causing the formation of a depression in the surface of said second workpiece adjacent said first workpiece having an area slightly greater than the cross-section area of said punch, and into which said bottom piece is then extruded.

19. The method of extruding a hollow article from a cold steel workpiece supported at its sides and one end, which method comprises the steps of forming a depression in the unsupported end of said workpiece, depositing a solid lubricant in said depression, trapping said lubricant in said depression by inserting thereinto a punch having an end portion which decreases in diameter toward its tip and transverse dimensions such that its sides sealingly engage the periphery of said depression before its tip reaches the bottom thereof, and then driving said punch into said cold workpiece through the bottom of said depression to backwardly extrude the material thereof about the sides of said punch.

References Cited by the Examiner
UNITED STATES PATENTS

| | | | |
|---|---|---|---|
| 590,130 | 9/97 | Bungeroth | 207—10.5 |
| 1,691,725 | 11/28 | Leighton | 207—10 |
| 2,404,793 | 7/46 | Dickerman | 83—690 |
| 2,452,636 | 11/48 | Cunningham et al. | 207—10 |
| 2,668,345 | 2/54 | Eckstein | 207—10 |
| 2,756,494 | 7/56 | Sejournet | 207—10.1 |
| 2,879,887 | 3/59 | Hawtin | 207—10 |
| 3,034,201 | 5/62 | Gammon et al. | 207—10 |

CHARLES W. LANHAM, *Primary Examiner.*
ROBERT F. WHITE, MICHAEL V. BRINDISI,
*Examiners.*